United States Patent [19]

Brettschneider

[11] Patent Number: 5,103,886
[45] Date of Patent: Apr. 14, 1992

[54] PNEUMATIC VEHICLE TIRE HAVING BEAD PORTIONS THAT CAN BE TURNED IN AND BEAD CORES EMBEDDED IN THE BEAD PORTIONS

[75] Inventor: Wolfgang Brettschneider, Seelze, Fed. Rep. of Germany

[73] Assignee: Continental Aktiengesellschaft, Hanover, Fed. Rep. of Germany

[21] Appl. No.: 566,088

[22] Filed: Aug. 10, 1990

[30] Foreign Application Priority Data

Aug. 17, 1989 [DE] Fed. Rep. of Germany ....... 3927127

[51] Int. Cl.$^5$ ............................................. B60C 15/04
[52] U.S. Cl. .................................... 152/540; 152/451; 245/1.5
[58] Field of Search ..................... 152/539, 540, 379.3, 152/379.5, 380, 544, 541; 245/1.5; 57/212, 213, 902

[56] References Cited

U.S. PATENT DOCUMENTS

| | | | |
|---|---|---|---|
| 1,373,632 | 4/1921 | Phelps | 57/213 |
| 1,481,934 | 1/1924 | Sunderland | 57/213 |
| 3,741,507 | 6/1973 | Hahn | 245/1.5 |
| 4,763,466 | 8/1988 | Abe et al. | 245/1.5 |
| 4,955,418 | 9/1990 | Baumhöfer | 152/539 |

FOREIGN PATENT DOCUMENTS 0346663 12/1989 European Pat. Off. ......... 152/379.3
0119564 10/1930 Fed. Rep. of Germany ....... 245/1.5

OTHER PUBLICATIONS

U.S. patent application Ser. No. 07/366,648 filed Jun. -14-89.

Primary Examiner—Michael W. Ball
Assistant Examiner—Nancy Krawczyk
Attorney, Agent, or Firm—Robert W. Becker & Associates

[57] ABSTRACT

A pneumatic vehicle tire having bead portions that can be turned in is provided. Embedded in the bead portions are bead cores built up from load-carrying elements that essentially extend in a circumferential direction. The load-carrying elements are disposed in such a way that each element is in contact with at least two other load-carrying elements. The load-carrying elements, at least to the extent that they are coated with rubber, have a surface that prevents adhesion to vulcanized rubber. The load-carrying elements of a bead core are disposed in layers, with the elements of the outer layer being disposed in such a way that they do not contact one another.

3 Claims, 3 Drawing Sheets

PNEUMATIC VEHICLE TIRE HAVING BEAD PORTIONS THAT CAN BE TURNED IN AND BEAD CORES EMBEDDED IN THE BEAD PORTIONS

BACKGROUND OF THE INVENTION

The present invention relates to a pneumatic vehicle tire having bead portions that can be turned in, whereby embedded in the bead portions are bead cores that are built up in a cable-like manner from load-carrying elements that essentially extend in a circumferential direction, with the load-carrying elements, when the bead core is viewed in cross-section, being disposed in such a way that each load-carrying element, disregarding a possibly unavoidable extremely thin intermediate film, is in contact with at least two other load-carrying elements.

Tires of this general type are known. In addition, work is being done with tires where the bead cores are built up from load-carrying elements that have a surface that prevents adhesion to vulcanized rubber. Although these tires, which require the bead portions to be able to be turned in order to be able to mount the tire on a rim where the rim flanges are directed radially inwardly, already exhibit improvements with regard to running true, further improvements with respect thereto and with respect to the reproduceability would be desirable.

It is therefore an object of the present invention to reduce the mean value of the errors in true running or concentricity, and also to reduce the band width of fluctuations of the true running that might occur. In this connection, the value of the true running is essentially evaluated with reference to the radial force fluctuations. Good reproduceability of the true running values refers to the smallness of the fluctuations of these values after the tire has been mounted a number of times.

BRIEF DESCRIPTION OF THE DRAWINGS

These and other objects and advantages of the present invention will appear more clearly from the following specification in conjunction with the accompanying schematic drawings, in which.

SUMMARY OF THE INVENTION

Figure 1:
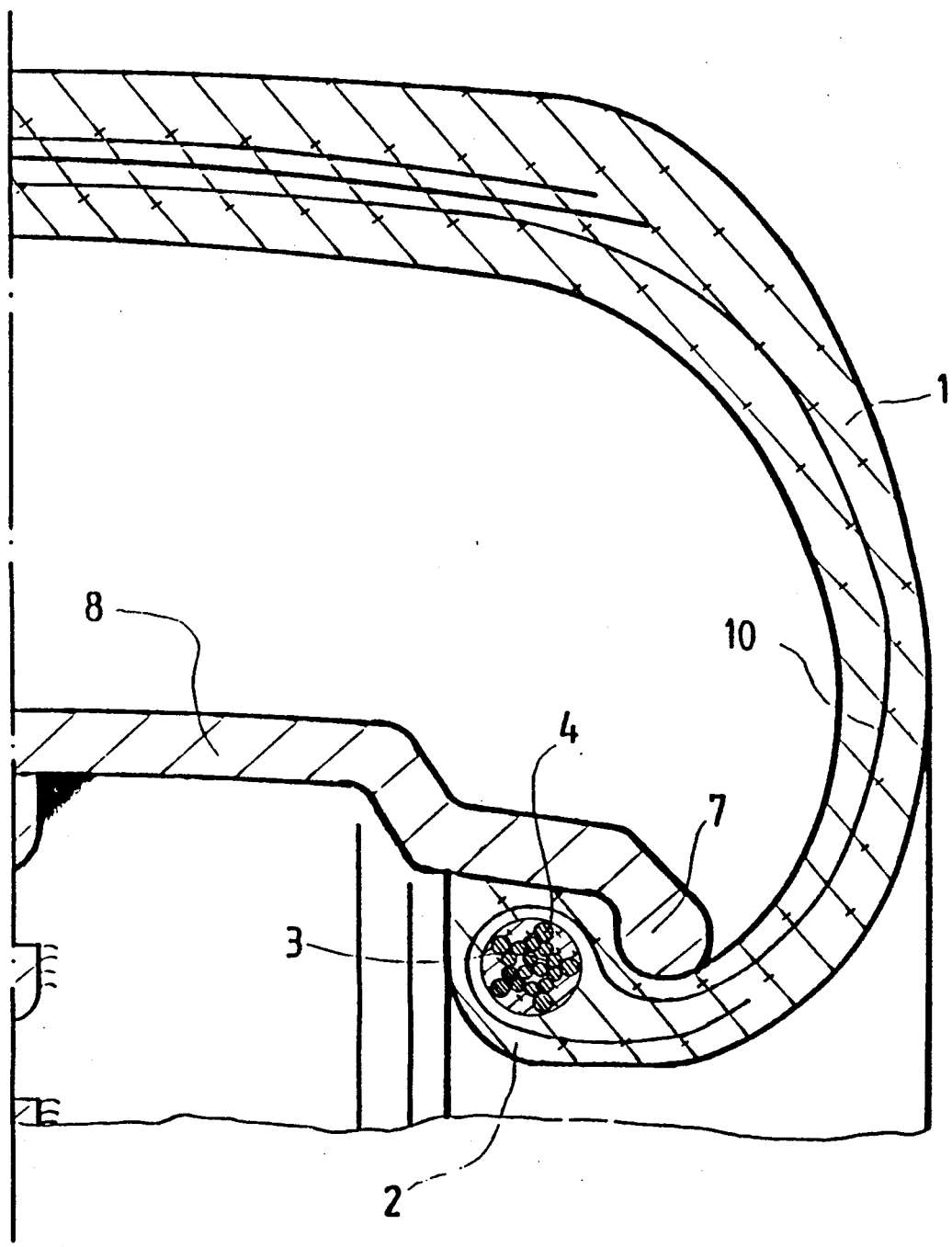
FIG. 1 is a cross-sectional view of part of one exemplary embodiment of the inventive pneumatic vehicle tire.

The pneumatic vehicle tire of the present invention is characterized primarily in that the load-carrying elements, at least to the extent that they are coated with rubber, have a surface that prevents adhesion to vulcanized rubber, and in that the load-carrying elements of each bead core are disposed in layers, including an outer layer and at least one inner layer, with the load-carrying elements of the outer layer being disposed in such a way that they do not contact one another.

Up till now, the bead core construction was such that the load-carrying elements of the outer layer of the core were in contact not only with the load-carrying elements of the adjacent next inner layer, but were also in contact with the adjacent other load-carrying elements of the same outer layer, whereby in any case a structurally insignificant, for manufacturing efficiency not always avoidable, extremely thin intermediate rubber film having a thickness of only a few hundredths of a millimeter was produced here and there. In contrast, pursuant to the present invention there should exist between the load-carrying elements of the outer core layer a spacing of at least 0.5 mm relative to any point of an adjacent load-carrying element of the same core layer.

The basis of the present invention is the new theory that for the repetition correlation of the true running, more important than the position of the bead in the radial and axial directions relative to the rim, is the angular position of the bead in the tire section. Initial tests showed a clear correlation between the angular position of the bead and the true running or concentricity values. The angular position of the bead refers to the angle that the tangent on the radially inner side of the bead forms with the axis of rotation of the tire or a line that is parallel thereto. Based upon this new theory, the present invention proceeds from the concept that the angular position of the bead core can be reproduced to a considerably greater extent than the surrounding bead, especially the rubber and looped-around carcass ply thereof, due to the fact that the bead core is constructed of considerably stiffer material, preferably steel wire, than is the surrounding bead portion. Based upon this, the significant inventive concept is the realization of a fixed, positive notch-tooth-like connection of the rubber of the bead portion to the bead core. As a consequence of the inventively large spacing of the load-carrying elements of the outer core layer relative to one another, this space is filled with the stiff bead rubber composition, and after conclusion of vulcanization of the rubber of the bead portion, a fixed inner toothing or serration results to which the spaced-apart load-carrying elements of the outer core layer impart the conforming outer toothing.

It is recommended that the shortest distance between two adjacent load-carrying elements of the outer layer be equal to at least 20% and at most 65% of the pertaining wire diameter. If the distance is too small, the inwardly directed rubber teeth of the bead rubber are then not adequately resistant. On the other hand, if the shortest distance is greater than 65% of the pertaining wire diameter, although the resulting teeth are very stiff, there are not enough of them, so that the danger exists that the load-carrying elements of the outer bead-core layer more in response to torsional stress, resulting in an irregular build up of the bead core. The smallest distance between two adjacent load-carrying elements of the outermost bead core layer is preferably between 45 and 60% of the wire diameter.

Within the framework of the present application, the term "layer" groups together those load-carrying elements that have the same diameter and also have the same distance in the tire section from the middle of the bead core. When speaking of two bead core layers, the outermost one is that where the center points of the load-carrying elements, when viewing the tire section, have the greatest distance from the center point of the bead core.

An inner toothing having a particularly good load-carrying capacity results in the rubber of the bead portion if the load-carrying element diameter of the outer layer of the bead core is greater than the load-carrying element diameter of the adjacent next inner layer.

Further specific features of the present invention will be described in detail subsequently.

DESCRIPTION OF PREFERRED EMBODIMENTS

Referring now to the drawings in detail, FIG. 1 shows an inventive pneumatic vehicle tire 1, the bead portions 2 of which extend about the rim flanges 7 of the wheel rim 8. In so doing, the bead portions 2 are disposed on the radially inner side of the rim 8. Disposed in the bead portions 2 are bead cores 3 that are comprised of load-carrying elements 4. In all three of the illustrated embodiments, the load-carrying elements 4 are made of steel wires. A radical carcass 10 is looped about the bead cores 3.

Figure 2:
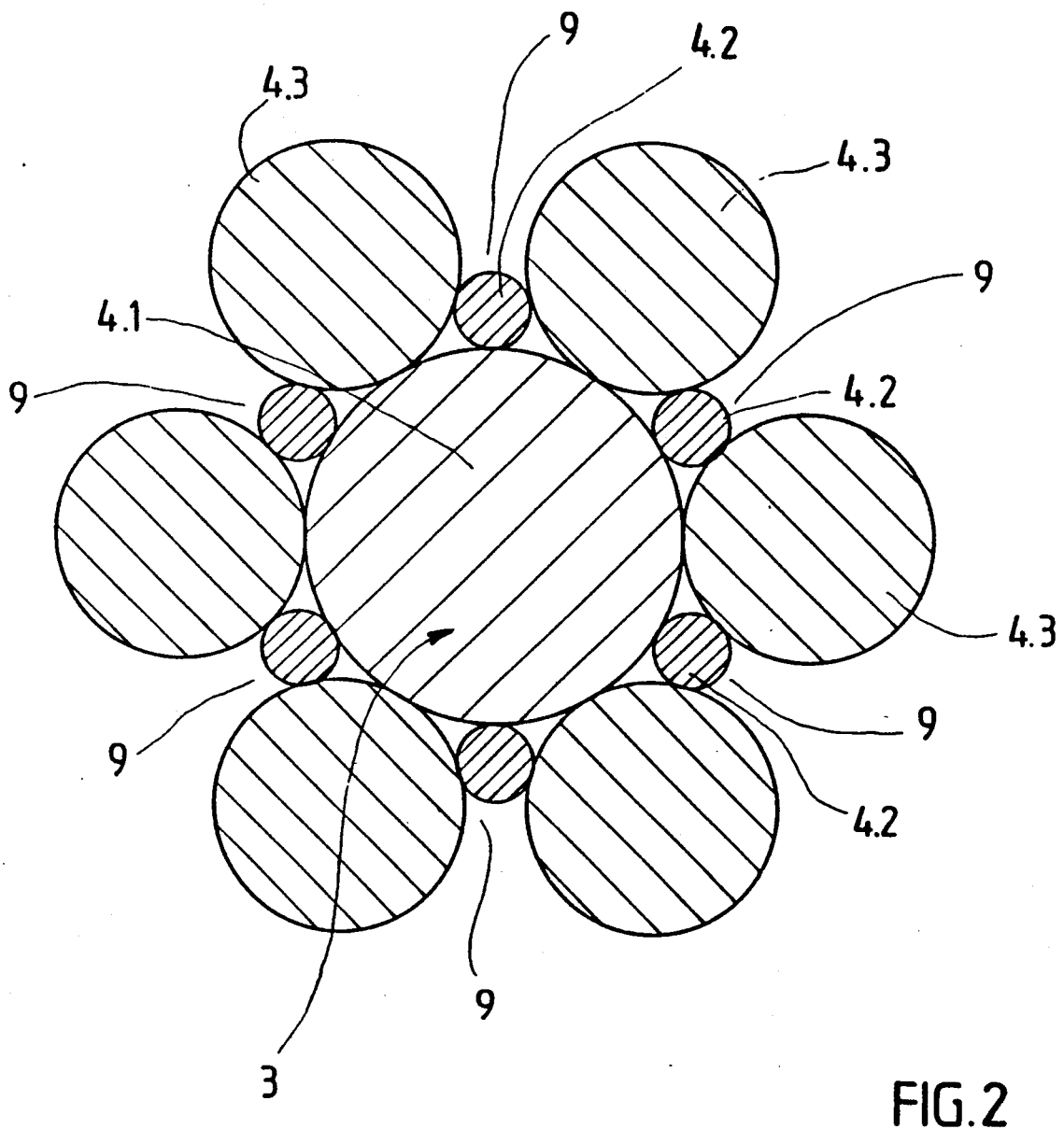
FIG. 2 shows one embodiment of a bead core having two layers, each of which is in contact with the center wire.

FIG. 2 is a detailed cross-sectional view of a bead core 3 that is comprised of a center wire 4.1, six smaller diameters wires 4.2 that form an inner layer, and the six wires 4.3 of the outer layer. The wires 4.2 of the inner core layer are considerably inner than the wires 4.3 of the outer layer, as a result of which large gaps result between the wires 4.3 of the outer layer. Not only the wires 4.2 of the inner layer, but also the wire 4.3 of the outer layer contact the center wire 4.1. The resulting spaces, into which the bead rubber is to enter in a notch-tooth or serration fashion, are designated by the reference numeral 9.

Figure 3:
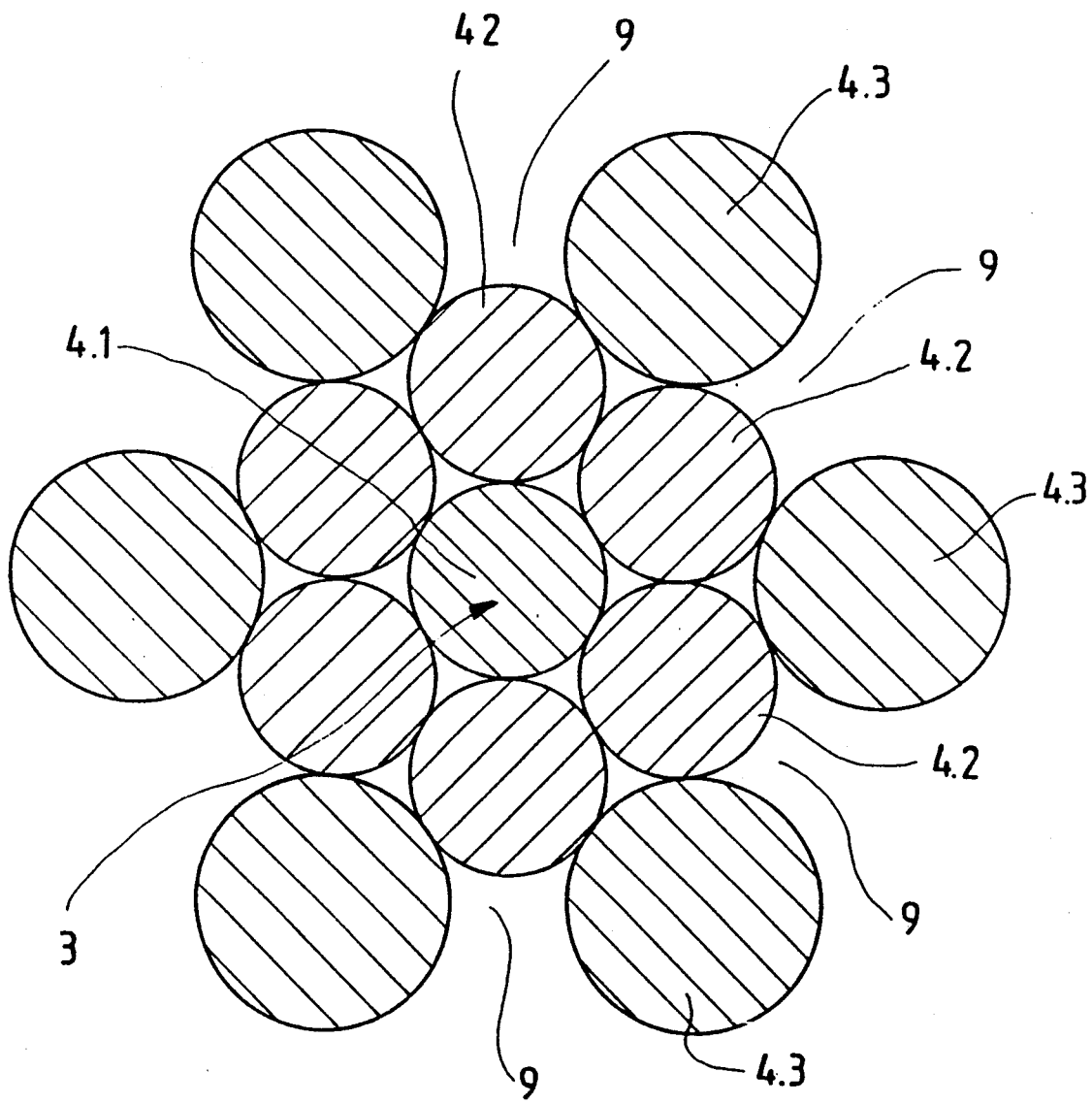
FIG. 3 shows another exemplary embodiment of a two-layer bead core where only the inner layer is in contact with the center wire.

FIG. 3 shows a bead core cross section that is also built up of 13 individual wires, including a center wire 4.1 and the wires 4.2 of an inner layer; however, in contrast to the embodiment of FIG. 2, each of the wires 4.3 of the outer layer contacts only two wires 4.2 of the inner layer, i.e. does not contact the center wire 4.1. The bead core section of the embodiment of FIG. 3 is particularly flexible, since the center wire 4.1 is not thicker than the wires 4.2 of the inner layer. The spaces 9 that result between the wires 4.3 of the outer layer are of such a size in the circumferential direction of the bead core cross section, that after vulcanization the rubber that has passed into these spaces 9 yields a tooth construction that has a load-carrying capacity. This effect is improved even further due to the fact that the core wires 4.3 of the outer layer are thicker than all of the rest of the core wires 4. The significant teaching of the present invention is that with tires where the bead portions can be turned in, the ability to run true can be increased by disposing the load-carrying elements of the outer layer of the core in such a way that they are spaced at least 0.5 mm from one another.

The present invention is, of course, in no way restricted to the specific disclosure of the specification and drawings, but also encompasses any modifications within the scope of the appended claims.

I claim:

1. In a pneumatic vehicle tire having bead portions that are adapted to be mounted on the radially inner edge of a wheel rim, whereby embedded in said bead portions are bead cores that are built up in a cable-like manner from load-carrying elements that essentially extend in a circumferential direction, with said load-carrying elements, when said bead cores are viewed in cross-section, being disposed in such a way that each load-carrying element, disregarding a possibly unavoidable extremely thin intermediate film, is in contact with at least two other load-carrying elements, the improvement wherein:

rubber coated portions of said load-carrying elements have a surface that prevents adhesion to vulcanized rubber; and said load-carrying elements of each of said bead cores are disposed in layers, including an outer layer and at least one inner layer, with said load-carrying elements of said outer layer being disposed in such a way that they do not contact one another, and with said load-carrying elements of said outer layer having a larger diameter than do the load-carrying elements of the adjacent next inner layer.

2. A pneumatic vehicle tire according to claim 1, in which the shortest distance between two adjacent load-carrying elements of said outer layer is at least 20% and at most 65% of the diameter of said elements.

3. A pneumatic vehicle tire according to claim 2, in which the shortest distance between two adjacent load-carrying elements of said outer layer is between 45 and 60% of the diameter of said elements.

* * * * *